(12) United States Patent
Yu et al.

(10) Patent No.: US 11,211,874 B2
(45) Date of Patent: Dec. 28, 2021

(54) FLYBACK CONVERTER WITH NO-LOAD POWER CONTROL FOR REDUCED POWER CONSUMPTION

(71) Applicant: DIALOG SEMICONDUCTOR (UK) LIMITED, London (GB)

(72) Inventors: Kevin Yu, Hong Kong (CN); Miranda Lam, Hong Kong (CN)

(73) Assignee: DIALOG SEMICONDUCTOR (UK) LIMITED, London (GB)

(*) Notice: Subject to any disclaimer, the term of this patent is extended or adjusted under 35 U.S.C. 154(b) by 188 days.

(21) Appl. No.: 16/270,952

(22) Filed: Feb. 8, 2019

(65) Prior Publication Data

US 2020/0259421 A1 Aug. 13, 2020

(51) Int. Cl.
| | | |
|---|---|---|
| H02J 7/02 | (2016.01) | |
| H02M 3/335 | (2006.01) | |
| H02M 1/08 | (2006.01) | |
| H02M 1/44 | (2007.01) | |
| H02J 7/00 | (2006.01) | |
| H02M 1/00 | (2006.01) | |

(52) U.S. Cl.
CPC ......... *H02M 3/33592* (2013.01); *H02J 7/00* (2013.01); *H02J 7/022* (2013.01); *H02M 1/08* (2013.01); *H02M 1/44* (2013.01); *H02M 1/0048* (2021.05)

(58) Field of Classification Search
CPC .................................................. H02M 3/33592
USPC .......................................................... 320/128
See application file for complete search history.

(56) References Cited

U.S. PATENT DOCUMENTS

| | | | | |
|---|---|---|---|---|
| 6,549,429 B2* | 4/2003 | Konno | ................ | H02M 3/335 363/21.04 |
| 8,890,481 B2* | 11/2014 | Mori | .................... | H02J 7/0047 320/134 |
| 2010/0202161 A1* | 8/2010 | Sims | ....................... | H02M 7/02 363/20 |
| 2011/0128153 A1* | 6/2011 | Sims | ....................... | G06F 1/325 340/636.1 |
| 2014/0016359 A1* | 1/2014 | Telefus | ................. | H02M 3/335 363/16 |

* cited by examiner

*Primary Examiner* — Edward Tso
*Assistant Examiner* — Ahmed H Omar
(74) *Attorney, Agent, or Firm* — Haynes and Boone, LLP

(57) ABSTRACT

A flyback converter is provided with a secondary-side low-power-mode controller that detects whether a mobile device has been disconnected from the flyback converter. In response to this detection, the low-power-mode controller initiates a low-power mode of operation in which a primary-side controller is disabled to increase efficiency.

9 Claims, 3 Drawing Sheets

FLYBACK CONVERTER WITH NO-LOAD POWER CONTROL FOR REDUCED POWER CONSUMPTION

TECHNICAL FIELD

This application relates to switching power converters, and more particularly to a flyback converter with no-load power control for reduced power consumption.

BACKGROUND

A flyback switching power converter is typically used to charge mobile devices such as smartphones and tablets since its transformer provides safe isolation from AC household current. Flyback converters operate with high efficiency while the mobile device presents a load. But this efficiency tends to drop significantly during no-load states such as when a flyback converter remains connected to an AC mains but no mobile device is connected for charging. These efficiency issues may be better appreciated through a consideration of an example flyback converter 100 shown in FIG. 1.

In flyback converter 100, a rectified input voltage (V_IN) drives a magnetizing current into a first terminal of a primary winding of a transformer T1 when a controller 105 cycles on an NMOS power switch transistor S1. The source of power switch transistor S1 couples to ground whereas its drain couples to a remaining second terminal of the primary winding. Controller 105 regulates an output voltage (V_OUT) produced at a secondary side of transformer T1 by controlling the cycling of power switch transistor S1. But controller 105 cannot directly monitor the output voltage such as through a wire or lead because the isolation through transformer T1 would then be broken. In flyback converter 100, controller 105 monitors the output voltage using primary-only feedback techniques by sensing a reflected feedback voltage ($V_{FB}$) at the transformer reset time on an auxiliary winding 110 of transformer T1. The auxiliary winding voltage may also be rectified through a diode D1 and stored across a capacitor C1 to provide to generate a power supply voltage Vcc for controller 105.

When the magnetizing current flows through the primary winding, a secondary-side synchronous rectifier (SR) controller 115 switches off an SR switch transistor S2 in series with a secondary winding of transformer T1 to prevent the secondary winding current from flowing. When power switch transistor S1 is switched off, SR controller 115 cycles on SR switch transistor S2 to allow the stored magnetic energy in transformer T1 to drive the secondary winding current to charge the output voltage stored across an output capacitor C2.

The efficiency of flyback converter 100 is affected by the controller power consumption in primary-side controller 105 and SR controller 115. During periods of relatively high load, the controller power consumption is a relatively minor factor in the flyback converter efficiency. But as the load drops, the controller power consumption becomes a significant factor in lowering the efficiency. At very low or no load states, primary-side controller 105 enters a burst mode or skip mode of operation in which power pulses are sent relatively infrequently. During this no-load operation, primary-side controller 105 continues to draw an operating current (I_Vcc). Similarly, SR controller continues to draw an operating current (I_SR). The total controller power consumption is thus Vcc*I_Vcc+V_OUT*I_SR. This controller power consumption continues unabated as it is a common practice to leave the flyback converter connected to the AC mains despite the disconnection of the mobile device from the flyback converter. The controller power consumption is thus a significant factor in lowering efficiency, particularly at higher levels for the output voltage.

Accordingly, there is a need in the art for flyback converters with improved low or no-load efficiency.

SUMMARY

To improve efficiency during no-load states of operation, a secondary-side low-power-mode controller is provided for a flyback converter that coordinates with a primary-side watchdog circuit. The low-power-mode controller is configured to detect a no load condition occurring when a mobile device is disconnected from the flyback converter. In response to this detection, the low-power-mode controller shuts down a secondary-side SR controller (in SR embodiments) and signals the watchdog circuit to enter a low-power-mode of operation. In the low-power-mode of operation, the watchdog circuit commands a primary-side controller that controls the cycling of a power switch transistor to enter a sleep mode of operation in which the primary-side controller consumes no power.

Since the primary-side controller is not cycling the power switch transistor during the low-power mode of operation, an output capacitor maintains a power supply voltage for the low-power-mode controller. An output voltage stored across the output capacitor will then slowly decline during the low-power mode of operation due to the (minimal) power consumption of the low-power-mode controller and leakage losses. The low-power-mode controller is further configured to monitor the output voltage and to trigger an end to the low-power mode of operation responsive to the output voltage dropping below a threshold voltage. In response to detecting that the output voltage has dropped below the threshold voltage, the low-power-mode controller enables operation of the SR controller (in SR embodiments) and triggers the watchdog circuit to enable operation of the primary-side controller. The primary-side controller may then proceed to cycle the power switch transistor sufficiently such that the output voltage is restored. Should the no-load condition persist, the low-power-mode controller would then trigger the low-power mode of operation again responsive to the restoration of the output voltage. Since the combined power consumption of the watchdog circuit and the low-power-mode controller during the low-power-mode of operation is less than the combined controller power consumption for the primary-side controller and the SR controller, efficiency is greatly enhanced during no-load operation.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To increase efficiency, a flyback converter is provided with a secondary-side low-power-mode controller circuit and a primary-side watchdog circuit. The secondary-side low-power-mode controller is configured to detect when a mobile device is uncoupled from the flyback converter. Should the secondary-side low-power-mode controller detect this uncoupling, the secondary-side low-power-mode controller triggers a low-power mode of operation. During the low-power mode of operation, both the primary-side controller and the SR controller are isolated from their power supply voltages such that both of these controllers are shut down and consuming no power. The power consumption of the low-power-mode controller and the watchdog circuit is much less than the controller power consumption such that no-load efficiency is significantly enhanced. Some example embodiments will now be discussed in more detail.

Figure 1:
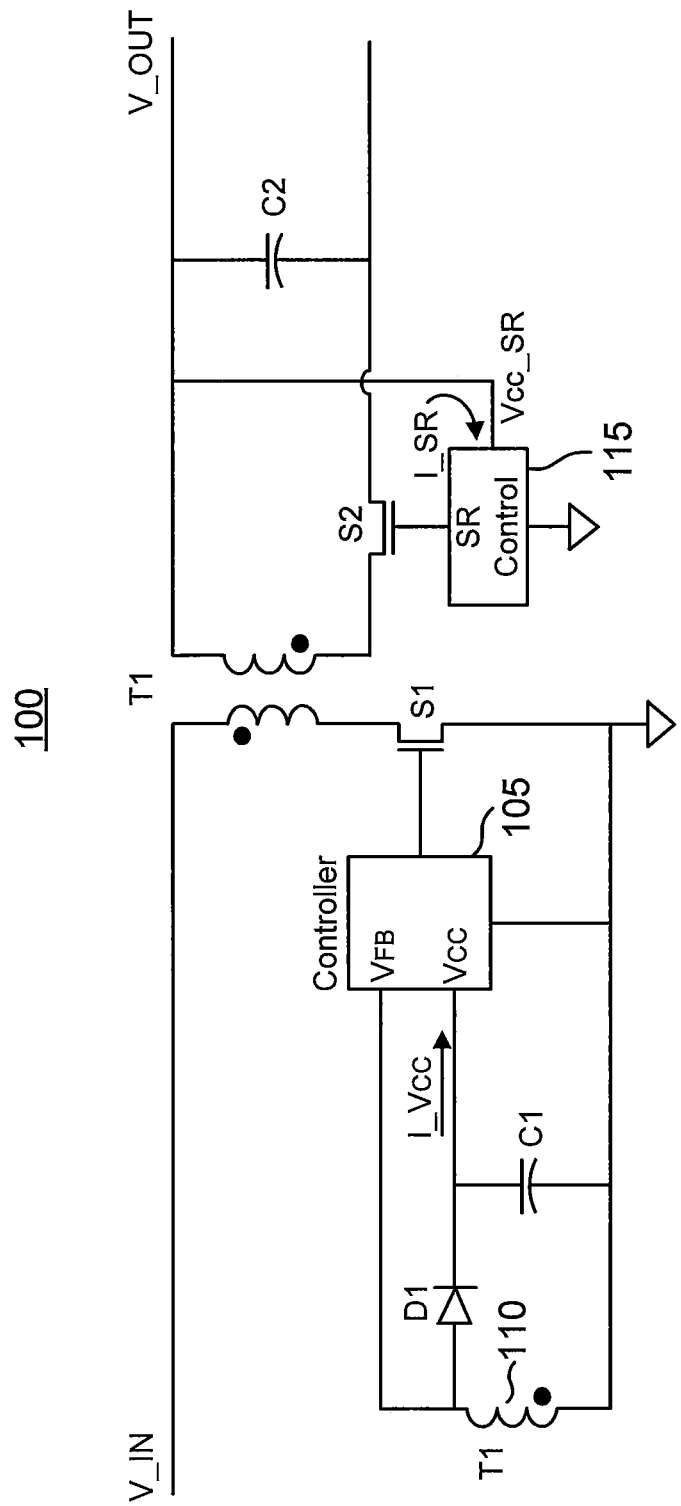
FIG. 1 is a diagram of a conventional flyback converter.
Figure 2:
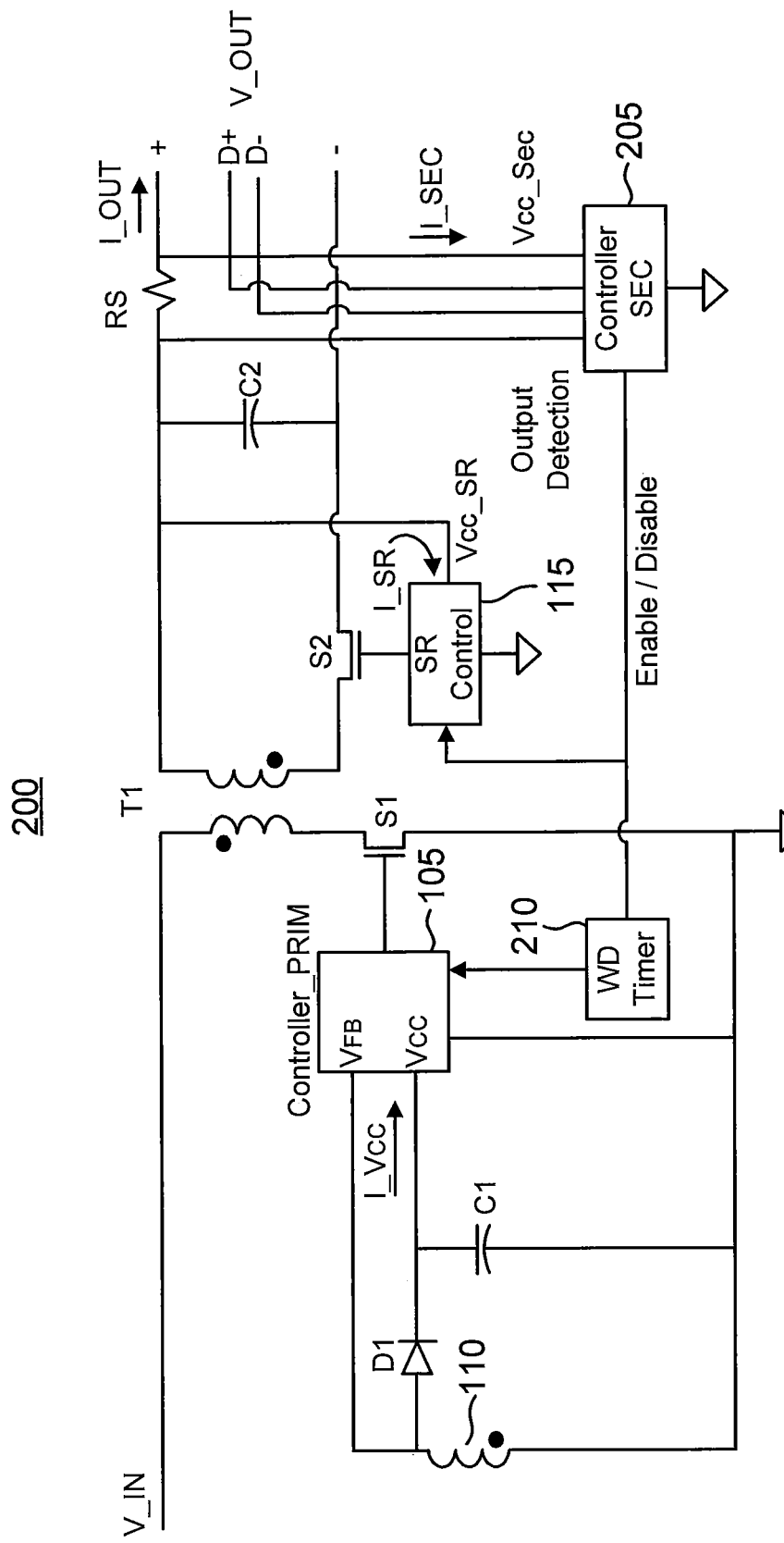
FIG. 2 is a diagram of a flyback converter configured for low-power operation during no-load or reduced load periods of operation in accordance with an aspect of the disclosure.

An example flyback converter 200 including a low-power-mode controller 205 and a watchdog circuit 210 is shown in FIG. 2. Flyback converter 200 includes a primary-side controller 105, diode D1, capacitor C1, transformer T1, auxiliary winding 110, power switch transistor S1, SR switch transistor S2, output capacitor C2, and an SR controller 115 as discussed with regard to flyback converter 100. During normal operation while a mobile device (not illustrated) is coupled to flyback converter 200, primary-side controller 105 regulates an output voltage V_OUT by controlling the cycling of power switch transistor S1 responsive to a feedback voltage $V_{FB}$ from auxiliary winding 110 as practiced in the primary-only feedback arts. Alternatively, the feedback voltage may be derived from the output voltage and transmitted from the secondary-side of transformer T1 through an optoisolator to primary-side controller 105. SR controller 115 maintains the SR switch transistor S2 off while the power switch transistor S1 is conducting. When primary-side controller 105 cycles off the power switch transistor S1, SR controller 115 cycles on the SR switch transistor S2 so that the stored magnetic energy in transformer T1 may drive an output current (I_OUT) and the output voltage for flyback converter 200.

The power consumption for primary-side controller 105 is a product of the current it consumes (I_Vcc) and its supply voltage Vcc as maintained through diode D1 and capacitor C1. Similarly, the power consumption for SR controller 115 is a product of the current it consumes (I_SR) and the output voltage which functions as a supply voltage Vcc_SR for SR controller 115. The total controller power consumption during regular operation is thus (I_Vcc*Vcc)+ (I_SR*Vcc_SR). In contrast, the power consumption for the low-power-mode controller 205 is a product of its input current I_SEC and its power supply voltage Vcc_Sec. Since the low-power-mode controller 205 is merely monitoring the low-power mode of operation, its power consumption (I_SEC*Vcc_Sec) is much less than the SR controller power consumption. The watchdog power consumption is even less than the low-power-mode controller power consumption so that the total power consumption during the low-power mode of operation is much less than the controller power consumption that would be consumed in a conventional flyback converter such as flyback converter 100.

To detect whether a mobile device is connected to flyback converter 200, low-power-mode controller 205 may monitor a voltage across a sense resistor Rs that is in series with the output power rail supplying the output voltage to such mobile devices. Should the voltage across the sense resistor Rs drop below a disconnect threshold voltage (such as 50 mv or another suitably low threshold voltage), low-power-mode controller 205 detects the disconnection of the mobile device. Note that is conventional to charge mobile devices through a data cable such as a USB cable or the Apple lightning cable. In such embodiments, low-power-mode controller 205 may monitor the data connections such as the D+ and D− interface in a USB cable to determine whether the mobile device is disconnected. Regardless of how low-power-mode controller 205 detects the mobile device disconnection, it is configured to proceed to trigger the low-power mode of operation accordingly. In addition, watchdog circuit 210 may include a timer.

Figure 3:
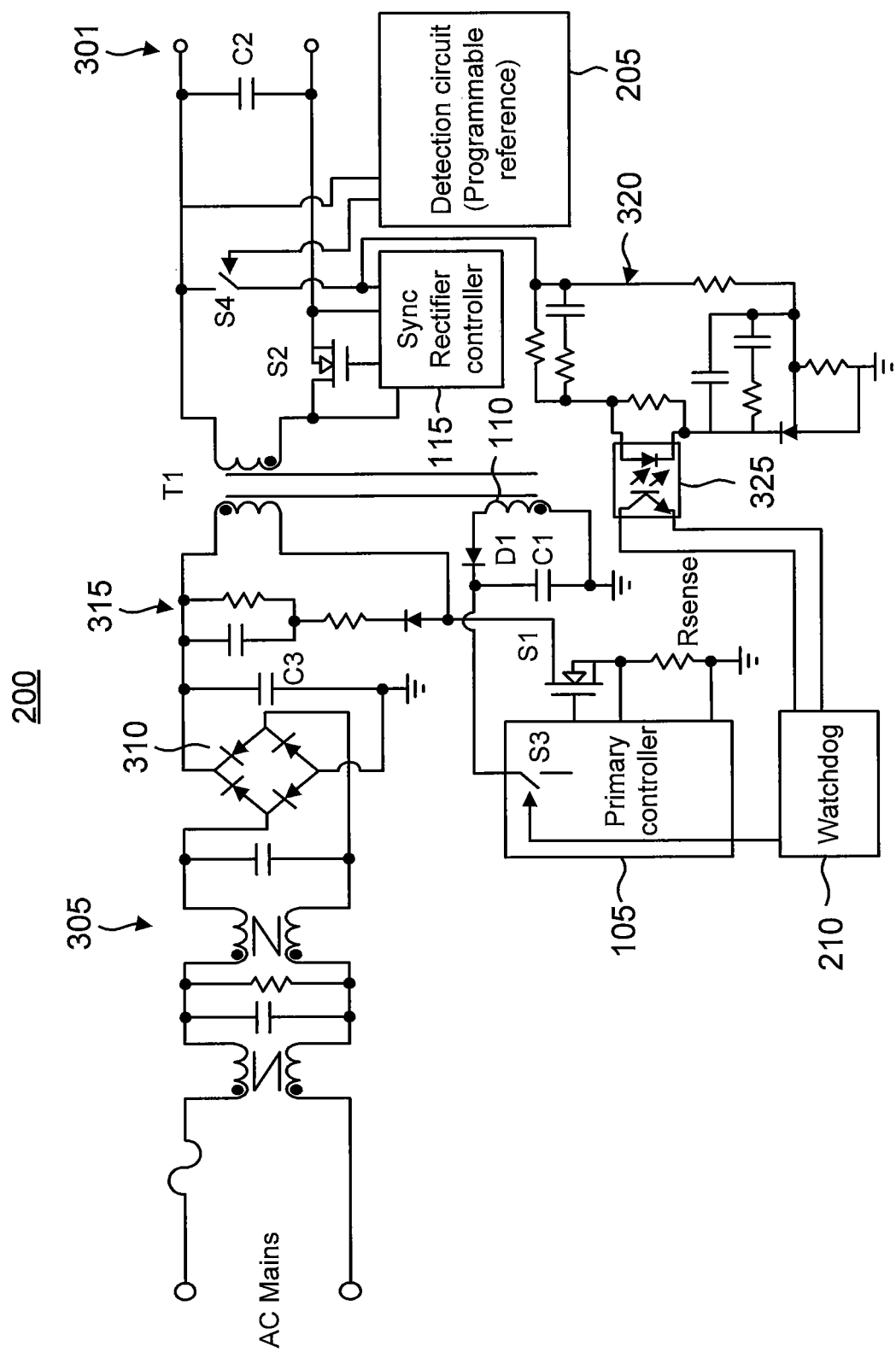
FIG. 3 is a more detailed diagram of an implementation for the flyback converter of FIG. 2.

Flyback converter 200 is shown in more detail in FIG. 3. An EMI filter 305 filters EMI noise from flyback converter 200 from affecting an AC mains. A diode bridge 310 rectifies the AC voltage from the AC mains to store a rectified input voltage across an input capacitor C3 The rectified input voltage drives a magnetizing current into the primary winding of transformer T1 when primary-side controller 105 switches on the power switch transistor S1. A choke 315 protects the drain of power switch transistor S1 from excessive voltages when the power switch transistor S1 is cycled off. Primary controller 105 is configured to monitor a current conducted through power switch transistor S1 by monitoring a voltage across a sense resistor Rsense. When the sense resistor voltage indicates that a desired peak current has been reached in the primary winding of transformer T1, primary-side controller 105 cycles off the power switch transistor S1. SR controller 115 and SR switch transistor S2 function as discussed with regard to FIG. 2. SR controller 115 is powered from the output voltage through a switch S4.

Low-power-mode controller 205 responds to a detection that a mobile device has disconnected from an output terminal 301 by switching off switch S4 to shut down SR controller 115. In addition, low-power-mode controller 320 signals watchdog circuit 210 to shut down primary-side controller 105. Note that low-power-mode controller 205 cannot directly signal watchdog circuit 210 through a lead or wire since such a connection would destroy the primary side and secondary side isolation provided by transformer T1. Thus, low-power-mode controller 205 signals watchdog circuit 210 through an optoisolator 325 as compensated by a compensation network 320. During normal operation, the secondary-side of opto-isolator 325 receives power through switch S4 as coupled through compensation network 320. To trigger the low-power mode of operation, low-power-mode controller opens switch S4, which causes the primary-side output voltage of optoisolator 325 to drop to zero. Watchdog circuit 210 responds to this zero-voltage state for optoisolator 325 by opening a switch S3. Since primary-side controller 105 receives its power supply voltage Vcc through switch S3, primary-side controller 105 is shut down during the low-power mode of operation. Power switch transistor S1 is thus not cycled during the low-power mode. Watchdog circuit 210 is powered by the power supply voltage Vcc. Similarly, low-power-mode controller 205 is powered by the output voltage. The output voltage will then drop during the low-power mode since the power switch transistor S1 is not being cycled to replenish the output voltage. To prevent low-power-mode controller 205 from shutting down due to lack of power, low-power-mode controller 205 is configured to compare the output voltage to a first threshold voltage, which may be a programmable reference voltage. Should the output voltage drop below the first threshold voltage, low-power-mode controller 205 closes switch S4 so that optoisolator 325 and SR controller 115 are powered. Watchdog circuit 210 responds to the resulting output voltage from optoisolator 325 by closing switch S3 so that primary-side controller 105 may cycle the power switch S1.

The output voltage for flyback converter 200 will then rise above the first threshold to a desired level. To resume the low-power mode of operation, low-power-mode controller 205 may compare the output voltage to a second threshold voltage (which may also be programmable and is greater than the first threshold voltage). Should the mobile device continue to be disconnected and the output voltage rise above the second threshold voltage, low-power-mode controller 205 again initiates the low-power mode of operation.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter, comprising:
    a synchronous rectifier switch coupled to a secondary winding of a transformer;
    a power switch;
    a synchronous rectifier controller configured to control a cycling of the synchronous rectifier switch; and
    a low-power-mode controller configured to detect a no-load condition for the flyback converter, wherein the low-power-mode controller is further configured to switch off the power switch to shut down the synchronous rectifier controller responsive to a detection of the no-load condition for the flyback converter and to switch on the power switch to power the synchronous rectifier controller responsive to a detection of a load condition for the flyback converter.

2. The flyback converter of claim 1, wherein the low-power-mode controller is further configured to monitor a voltage across an output sense resistor to detect the no-load condition.

3. The flyback converter of claim 2, wherein the low-power-mode controller is further configured to detect the no-load condition responsive to the voltage across the output sense resistor dropping below a disconnection threshold voltage.

4. The flyback converter of claim 1, wherein the low-power controller is further configured to monitor a data terminal for a data and charging cable to detect the no-load condition.

5. The flyback converter of claim 4, wherein the low-power controller is further configured to monitor the data terminal to determine whether a mobile device is connected to the flyback converter through the data and charging cable, and wherein the low-power controller is further configured to detect the no-load condition responsive to a detection that the mobile device is disconnected from the data and charging cable.

6. The flyback converter of claim 4, wherein the data and charging cable is a USB cable.

7. The flyback converter of claim 1, wherein the low-power-mode controller is further configured to determine whether an output voltage for the flyback converter has dropped below a first threshold voltage during a low-power mode of operation, and wherein the low-power-mode controller is further configure to terminate a low-power-mode of operation responsive to a detection that the output voltage for the flyback converter has dropped below the first threshold voltage.

8. A method for a flyback converter, comprising:
    during an absence of a no-load condition for the flyback converter, cycling a synchronous rectifier switch transistor, wherein a synchronous rectifier controller controls the cycling of the synchronous rectifier switch transistor;
    detecting the no-load condition for the flyback converter; and
    opening a switch coupled between a power supply voltage node and the synchronous rectifier controller in response to a detection of the no-load condition for the flyback converter to shut down the synchronous rectifier controller.

9. The method of claim 8, further comprising:
    detecting a disconnection of a mobile device from the flyback converter to detect the no-load condition.

\* \* \* \* \*